Oct. 28, 1969          J. W. LACY          3,475,529

METHOD OF MAKING A PRESTRESSED HOLLOW CONCRETE CORE SLAB

Filed Dec. 23, 1966          4 Sheets-Sheet 1

INVENTOR
Johnson W. Lacy

BY *J. Hanson Boyden*

ATTORNEY

Oct. 28, 1969 J. W. LACY 3,475,529
METHOD OF MAKING A PRESTRESSED HOLLOW CONCRETE CORE SLAB
Filed Dec. 23, 1966 4 Sheets-Sheet 2

INVENTOR
Johnson W. Lacy

BY J. Hanson Boyden
ATTORNEY

Oct. 28, 1969　　　　　　J. W. LACY　　　　　　3,475,529
METHOD OF MAKING A PRESTRESSED HOLLOW CONCRETE CORE SLAB
Filed Dec. 23, 1966　　　　　　　　　　　　4 Sheets-Sheet 3
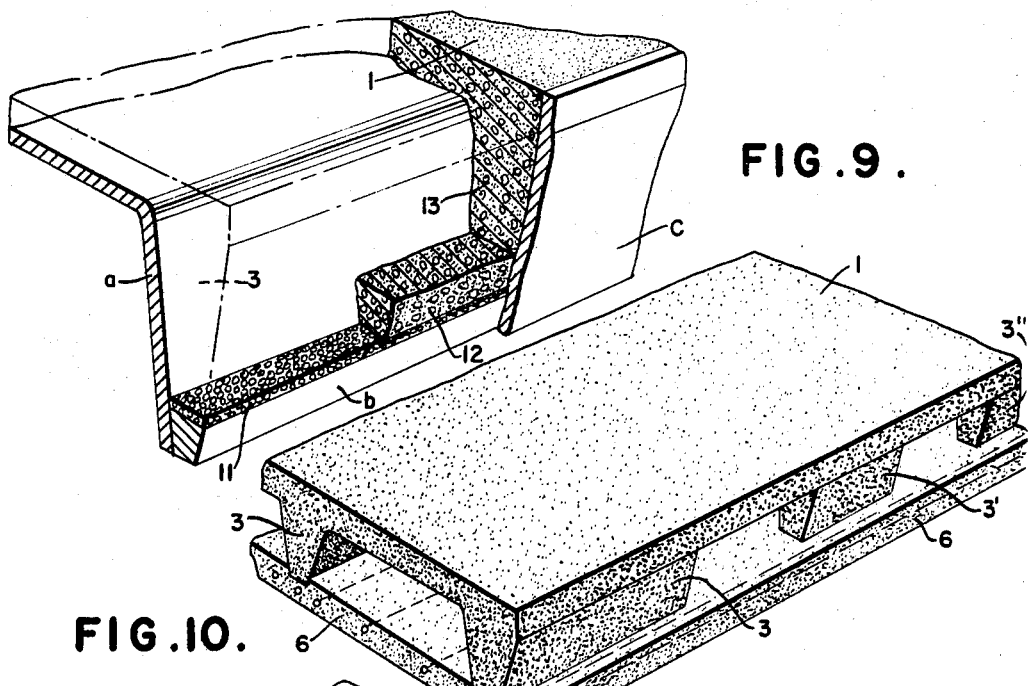
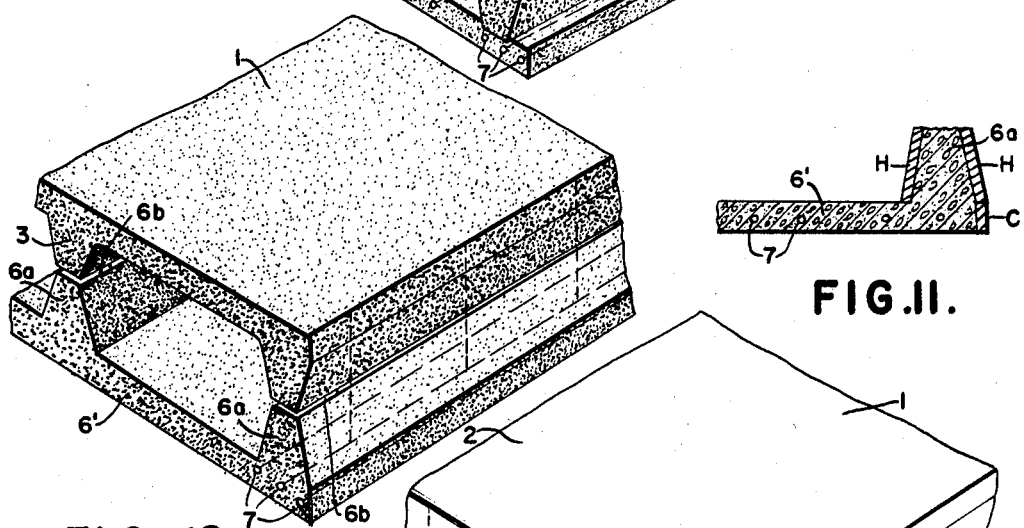
INVENTOR
Johnson W. Lacy
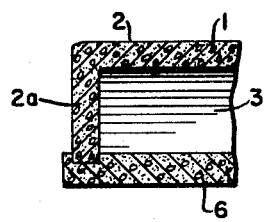
BY
ATTORNEY Oct. 28, 1969   J. W. LACY   3,475,529
METHOD OF MAKING A PRESTRESSED HOLLOW CONCRETE CORE SLAB
Filed Dec. 23, 1966   4 Sheets-Sheet 4

INVENTOR.
Johnson W. Lacy
BY J. Hanson Boyden,
ATTORNEY

United States Patent Office 3,475,529
Patented Oct. 28, 1969

3,475,529
METHOD OF MAKING A PRESTRESSED HOLLOW CONCRETE CORE SLAB
Johnson W. Lacy, Richmond, Va., assignor to Concrete Structures, Inc., Richmond, Va., a corporation of Virginia
Continuation-in-part of application Ser. No. 228,140, Oct. 3, 1962. This application Dec. 23, 1966, Ser. No. 613,694
Int. Cl. B28b 23/04
U.S. Cl. 264—228          2 Claims

ABSTRACT OF THE DISCLOSURE

The invention consists in a method of forming prestressed concrete structural building unit with hollow cores extending through the same, the method comprising molding a precast first member with a wide flat top and with spaced parallel ribs depending from the lower surface and defining the hollow cores between them, then setting up a form for a second member, stretching steel tendons through this form and applying tension thereto, filling this form with soft concrete, bringing the lower edges of the ribs of the first member down into close contact with the second member while in plastic condition, allowing the members to remain in contact until the concrete of the second member has hardened, thus bonding said members together to produce a single, integral unit, and then releasing the tension on said tendons, thus prestressing the entire unit.

---

This application is a continuation-in-part of my prior copending application Ser. No. 228,140, filed Oct. 3, 1962, now abandoned.

This invention relates to elongated concrete structural building units, and more particularly to a hollow core slab.

An object of the invention is to provide a hollow core slab for use as a floor or roof panel, such slab being exceptionally light but strong, economical to produce, and having continuous open channels extending longitudinally therethrough to receive utility cables and plumbing or heating pipes.

Another object is to provide a hollow core slab in which the hollow core is closed at one or both ends.

Yet another object is to devise an improved method of producing such a hollow unit by constructing it of an upper ribbed member and a separately cast lower member, the ribs of the ribbed member being brought into close contact with a surface of the lower member, and the two members securely united, so that the assembly provides a rigid composite structure.

A still further and important object of the invention is to devise an improved method of producing a hollow composite unit of the type above referred to which is effectively prestressed.

In doing this, pretensioned tendons are embedded in the lower member, and after the members have been assembled and united to form a rigid structure capable of withstanding the prestressing force, the tension on the tendons is released, whereby the composite unit as a whole is prestressed.

The effective uniting of the members may be carried out in many different ways. The ribbed upper member may be lowered, ribs down, into intimate contact with the surface of the bottom member while the latter, which may be in the form of a flat plate or slab, is in a plastic condition. In this way gravity causes the ribs of the upper member to penetrate and become strongly bonded to the lower member, when the latter has hardened. Thus, although there is necessarily some shrinkage of the bottom member as it hardens, this shrinkage cannot cause any separation of the two members.

Or both members may be ribbed, and the edges of the ribs of the respective members brought into close contact and bonded together. Pretensioned tendons are embedded in the lower member, when cast, and after this member has hardened and the two members suitably and rigidly united, the tension on the tendons is released, and the entire assembly becomes prestressed, as a unit.

Again, either as a substitute for or in addition to the above mentioned bonding, anchoring devices may be embedded in the bottom member adjacent the ends thereof, and a transversely extending concrete abutment, enveloping said anchoring devices, may be arranged to bear against the ends of the upper member so as to exert thrust against them and close the end of the hollow core.

With the above and other objects in view, and to improve generally on the details of such building units, the invention consists in the construction and combination of parts and method of assemblying them hereinafter described and claimed, and illustrated in the accompanying drawings, forming part of this specification, and in which:

FIG. 9 is a fragmentary perspective view showing still another method of producing the necessary bond, parts of the form for casting the upper member being also shown;

FIG. 10 is a perspective view, somewhat similar to FIGS. 4 and 5, but illustrating an upper ribbed member in which the ribs are not continuous;

FIG. 11 is a fragmentary transverse vertical section showing a method of casting a ribbed lower member;

FIG. 12 is a fragmentary perspective view showing a ribbed lower member united with a ribbed upper member;

FIG. 13 is a fragmentary perspective similar to FIG. 5, but showing a modified arrangement in which the end of the hollow core is closed, parts being broken away;

FIG. 14 is a vertical section substantially on the line 14—14 of FIG. 13, looking in the direction of the arrows;

Figure 2:
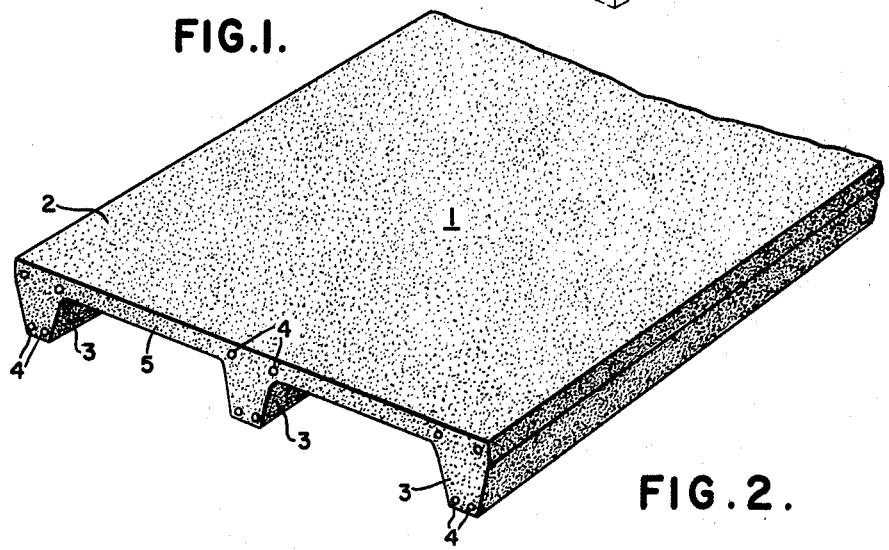
FIG. 2 is a fragmentary perspective view of the upper or ribbed member.

Referring to the drawings in detail, and first more particularly to FIG. 2, I first cast a concrete member 1, as shown in this figure. This member has a flat top 2, and a series of spaced, parallel, longitudinally extending ribs 3 projecting down from the lower side thereof. Conventional re-inforcing bars 4 may or may not be employed.

Figure 1:
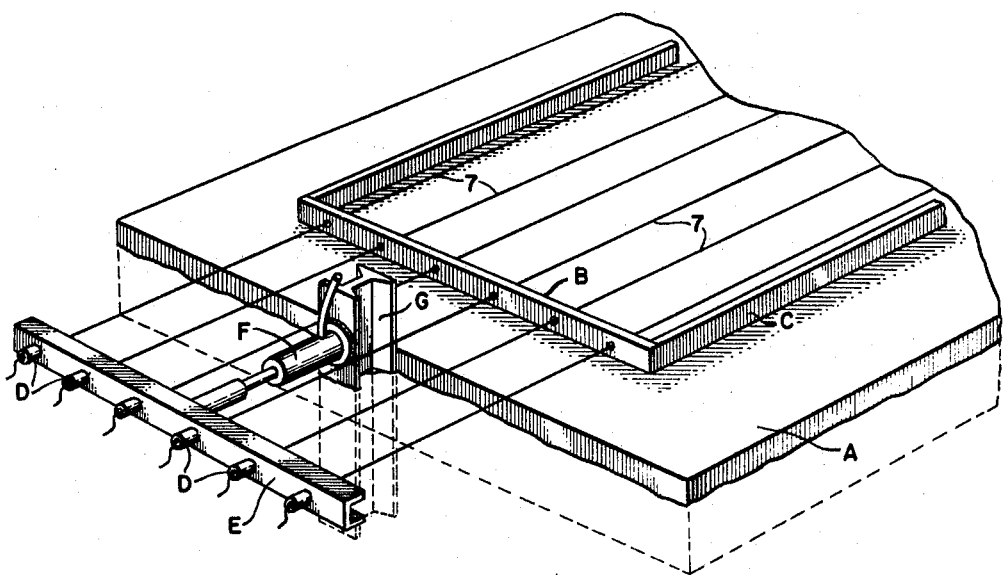
FIG. 1 is a perspective view showing the method of tensioning tendons in the bottom member of the slab.

Secondly, I prepare on a bed A, of concrete or the like, a mold made up of end piece B and side pieces C, as shown in FIG. 1. Through openings in the end piece B pass a set of steel tendons 7 which extend throughout the length of the form, parallel with the side pieces C, and are securely anchored to a fixed support at the far end (not shown). After passing through the end piece B the tendons 7 are received in suitable clamps D, carried by a cross bar E. Means are provided for forcing the cross bar outwardly, such means being illustrated, by way of example, as comprising a power cylinder F, supported against a strong abutment G, set into the ground adjacent the bed A, said power cylinder having a piston bearing against the cross bar E. When motive fluid is admitted to the cylinder, it will be obvious that the tendons 7 are strongly stretched, or put under tension. This method of tensioning tendons is a typical example of many methods that might be used.

While the tendons are thus tensioned, I pour concrete into the form B, C, thus casting a flat slab 6 which, in this embodiment of the invention, is to constitute the bottom member of my composite unit.

Figure 3:
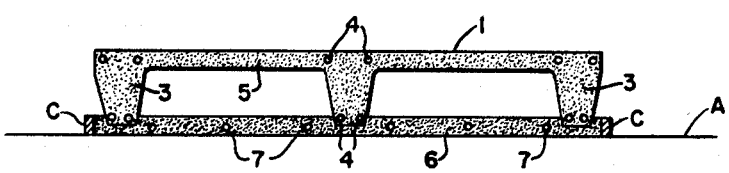
FIG. 3 is an end elevation showing the method of assembling the upper and bottom members to form my improved composite unit.

Then, while the concrete of this slab is still soft or plastic, I bring the ribs 3 of the upper member 1 down into close contact with the plastic surface of the slab 6, as shown in FIG. 3. I employ special means, as hereinafter described, for ensuring a strong bond between the lower edges of the ribs and the surface of the slab. As is well known, wet concrete shrinks when it dries or sets, and this shrinkage would tend to cause a separation of the parts at the interface. To prevent this, the precast top member is allowed to settle, under its own weight, into the shrinking bottom member, so that the edges of the ribs penetrate, to some extent, the surface of the bottom member, as indicated in FIG. 3.

Figure 4:
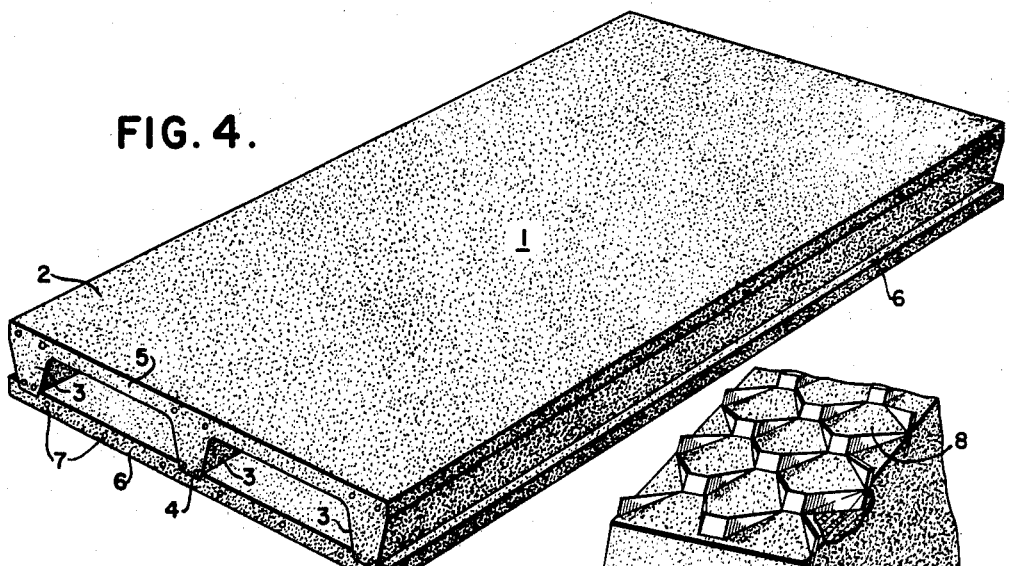
FIG. 4 is a perspective view showing one form of my complete, composite unit.

Finally, after the concrete of the bottom member 6 has completely hardened, I release the tension on the tendons 7, thus prestressing the entire combined hollow unit. The strength of my hollow core slab is substantially the same as that of a slab of similar cross-section made in one monolithic casting. The assembled combined unit is shown in FIG. 4, the projecting ends of the tendons having, of course, been cut off.

Figure 15:
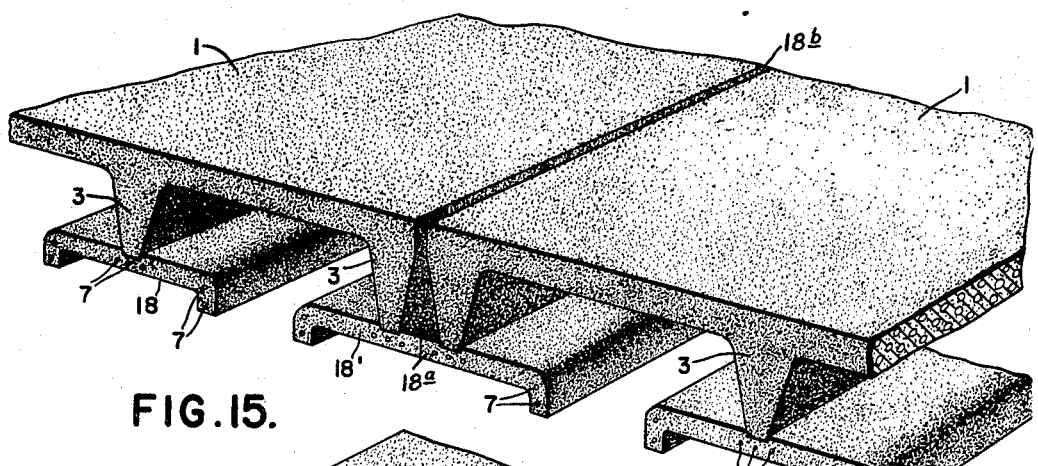
FIG. 15 is a fragmentary perspective view showing an assembly with a different form of lower member.

The bottom member 6 is preferably somewhat wider than the distance between the outer edges of the ribs, and the sides of these ribs may be slightly beveled to provide space between two adjacent units to receive a grout key, as shown in the middle of FIG. 15.

The body of the upper member 1 between the ribs is relatively thin, as indicated at 5, and the hollow spaces between the ribs and between the top wall 5 and the bottom member 6 form continuous open channels extending longitudinally of the unit. These provide accommodations for utility wires or cables, or for heating or plumbing pipes.

My improved hollow core slab has sound deadening and heat insulating properties, and is exceptionally light for its load bearing capability. Moreover, to still further reduce the weight, I find it satisfactory in some cases to make the upper ribbed member of a relatively light aggregate. Although the bottom member, carrying the tensioned tendons, is usually made from relatively heavy aggregrate, I find that it is entirely possible to obtain satisfactory bonding between the two members even when made of different types of aggregate.

Figure 6:
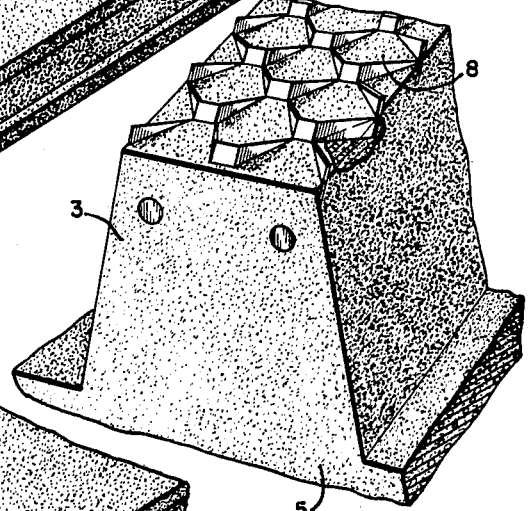
FIG. 6 is a fragmentary perspective view showing one of the ribs inverted, and illustrating one method of bonding the edge of the ribs of the upper member to the surface of the bottom member.

One method of obtaining the required bond is illustrated in FIG. 6. Here I have shown a piece of expanded metal mesh 8 partially embedded in the edge of each rib 3 at the time of casting. A portion of the mesh projects somewhat beyond the face of the rib, and this projecting portion enters and becomes embedded in the surface of the bottom member 6 when the upper member is brought into contact therewith, in the soft state, as described, thus effectively locking the parts together.

Figure 7:
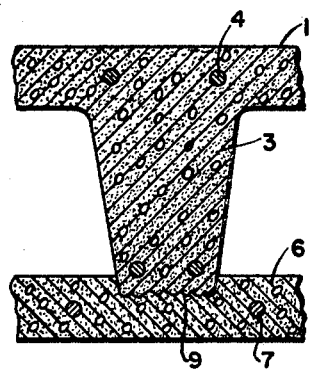

Another method of producing a bond is by roughening or corrugating the edge of the ribs as indicated at 9 in FIG. 7.

Figure 8:
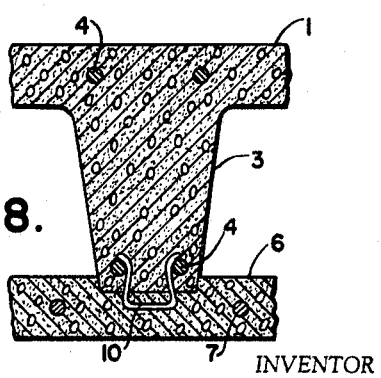
FIGS. 7 and 8 are enlarged, fragmentary transverse sections illustrating two other methods which may be employed for obtaining the desired bond.

Still another method is to embed in the edge of each rib at the time of casting a strip of wire netting or a series of wire loops or the like, as indicated at 10 in FIG. 8. This strip or these loops would of course have a portion projecting beyond the edge of the rib so as to penetrate the soft bottom member 6 when the parts are assembled as described.

Figure 5:
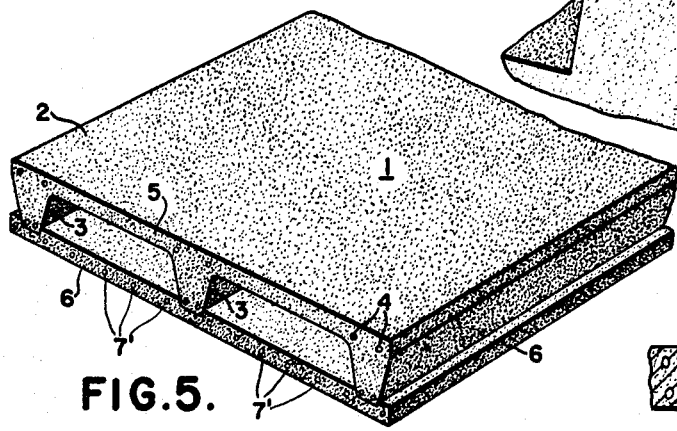
FIG. 5 is a fragmentary similar view showing a slightly modified arrangement.

While in FIGS. 1, 3, and 4, for simplicity, I have shown the use of only a few tendons 7, such as six, it will of course be understood that in actual practice, a much larger number, as indicated at 7′ in FIG. 5, may be employed, if desired.

In FIG. 9 there is illustrated still another method of providing for the effective bonding of the two members. In this figure a, b, c, represent mold forms for the casting of the upper member 1. On the form strip b is placed a layer 11 of coarse crushed dry aggregate. On top of that is placed a somewhat thicker layer 12 of a relatively dry mix of concrete. Then the standard concrete mix 13 is poured on top of this. The result is that the lower edge of each rib such as 3 when removed from the form has pieces of gravel or the like embedded therein and projecting slightly therefrom.

In FIG. 10, I have illustrated a construction similar to FIG. 3 but in which the ribs of the upper member are not continuous but are made up of spaced sections 3, 3′ and 3″. This not only produces a lighter slab, but also provides transversely extending passageways to receive pipes or utility wires.

In FIG. 11 I have illustrated an arrangement for producing a ribbed bottom member containing the pretensioned tendons. In addition to the mold members B and C, such as shown in FIG. 1, I provide, at each rib position a pair of form members H, the outer one resting on the form C, and the two members being inclined toward each other from the bottom toward the top so as to produce a tapered rib 6a. The top of this rib is roughened, as by any of the methods shown in FIGS. 6 to 8. After the concrete has hardened, the mold forms H and C are removed, and a layer of soft mortar spread on the roughened upper edge of each rib 6a. Then the previously cast upper member 1, having the lower edges of its ribs roughened as previously described, is lowered onto the bottom member with the respective ribs registering, as shown in FIG. 12, so that the roughened edges of the ribs of the upper member contact and more or less enter the layer 6b of soft mortar supported on the roughened top edges of the ribs of the lower member. Due to the weight of the upper member continuously pressing down on the mortar, a close contact is maintained with the mortar as it hardens, notwithstanding any shrinkage that may occur. Thus when this mortar has hardened it effectively bonds the two members together into a rigid unit having a hollow core, and a depth substantially double that of the unit shown in FIGS. 4 and 5. After the mortar has hardened the tension on the tendons 7 is released, thus prestressing the entire unit, as before.

This method differs from that previously described only in that, instead of the entire lower unit being in a soft or plastic condition at the time of assembly with the top unit, only the upper surface is soft or plastic, but the result is the same.

In FIGS. 13 and 14 I have illustrated one method of producing a hollow core slab in which the ends of the hollow core are closed. To do this, all that is necessary is to extend the flat top 2 of the upper member down over the ends of the ribs 3, as indicated at 2a, and have the lower edge of this extension terminate flush with the lower edge of the ribs. This can easily be done by removable mold forms when casting the upper member. Then, when the two members are assembled as described, the lower edge of the extension 2a, as well as of the ribs, becomes bonded to the bottom member 6, in the manner shown in FIGS. 3 and 5.

In FIG. 15, I have illustrated still another method of forming composite pre-stressed slabs. In this method, instead of flat bottom members, such as illustrated at 6, in the preceding figures, I employ channel shaped ceiling strips 18, 18', spaced apart as shown, to the upper surface of which the lower edges of the ribs of the upper members are bonded. The method of assembly is the same as that described in FIGS. 1 and 3, namely, the upper member is brought into contact with these strips 18, 18', while they are still in soft or plastic condition, and, after they have hardened, the tension on the tendons 7 is released (the forms for molding these strips 18, 18' have not been shown).

It will be seen that the middle ceiling strip is divided longitudinally into two parts, as indicated at 18a. In practice, one strip, 18 and one part of the adjacent middle strip are bonded to one ribbed member 1, as shown at the right of FIG. 15, while another strip 18, at the left, and the other part of the strip 18' are bonded to another ribbed member 1'. Thus each ribbed member, and the strip and part of a strip to which it is bonded, constitute a rigid unit, and these units are assembled, side by side, and united by means of a grout key 18b. Any desired number of such units can be used.

Figure 16:
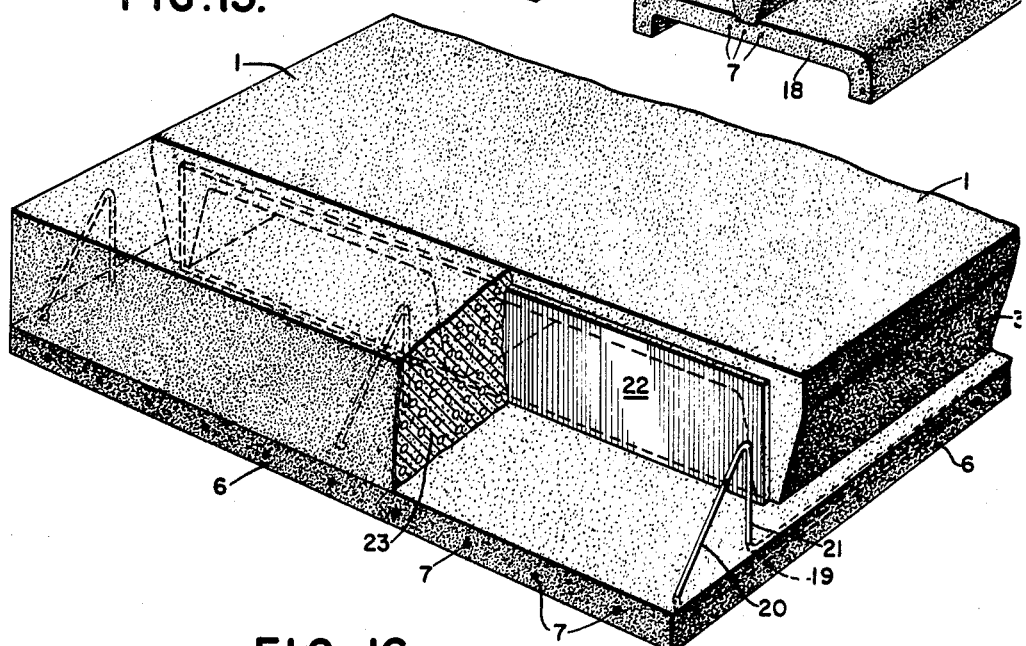
FIG. 16 is a perspective view showing a modified arrangement in which anchoring devices and a concrete abutment are used to transmit the pre-stress force from the lower to the upper member.
Figure 17:
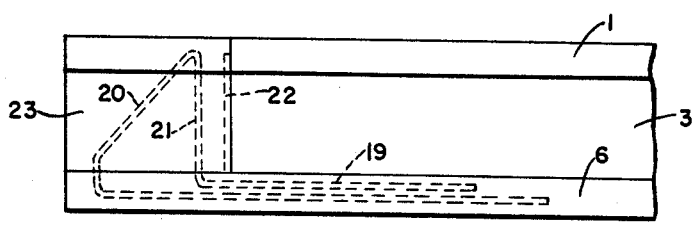
FIG. 17 is a fragmentary side elevation of the arrangement shown in FIG. 17.

In FIGS. 16 and 17, I have shown a different method. In these figures a plurality of pairs of rod 19 are embedded in the bottom member when cast, the ends of these rods adjacent the end of the bottom member being formed into upstanding loops or anchoring devices. As shown, by way of example, each of these loops has its outer side extending diagonally as shown at 20, and its inner side extending vertically as shown at 21. Other shapes could of course be used. A thin panel 22, which remains in the slab, is placed against the end of the upper member 1, which end is spaced a substantial distance inwardly from the end of the bottom member 6 thus providing a rectangular, transversely extending trough. In this trough, by means of removable mold forms (not shown) is then poured a mass of concrete 23 which envelops the anchoring devices 20, 21 and, when hardened, constitutes a transversely extending abutment bearing against the end of the upper member 1. Thus when tension on the tendons 7 is released, the whole assembly becomes prestressed.

This method of assembly provides another way for forming hollow cores with closed ends.

Heretofore, to the best of my knowledge, there have been only three ways of producing beams or slabs with hollow cores, namely:

(1) By using expendable forms, which remain in the beam or slab;

(2) By means of inflatable and collapsible tubes or the like, which can be withdrawn from the beam or slab; and (3) By extrusion.

The first method is expensive.

The second is expensive and cannot be used to produce hollow cores with closed ends.

The third method often produces slabs of poor quality because the plastic concrete tends to slump, and cannot be used to produce hollow cores with closed ends, either.

My new method is universally applicable, and overcomes the defects and objections inherent in previous methods. By the simple expedient of pre-casting the upper ribbed portion of the hollow core slab and securely bonding it to the lower portion to provide an assembly constituting a rigid unit, the problem of forms is obviated, and the production of hollow cores with closed ends is easily achieved.

Moreover, while it has heretofore been proposed to produce composite beams or slabs by combining a previously prestressed member with added concrete, my novel method comprises combining a preformed concrete member with additional concrete, and thereafter applying a pre-stressing force to the resulting mass. In other words, in my method, the pre-stressing force is not applied until after the two parts have been assembled to form a rigid unit.

What I claim is:

1. The method of forming an elongated hollow core structural building unit which comprises casting a first member of concrete in one piece, said member having a flat top disposed in horizontal position and having longitudinally extending ribs on its lower side, setting up on a bed a mold for a second member, entirely independent of said first member, stretching steel tendons through said mold and applying tension thereto, filling the mold with concrete to produce the second member, bringing the lower edges of the ribs of said first member down into close contact with the second member while at least the upper surface of said second member is in plastic condition, and allowing the members to remain in contact until the plastic concrete of the second member has hardened, thus inseparably bonding said members together to produce a single, integral unit, with hollow cores between the ribs, and then, after the two members have been assembled and bonded together, and only then, releasing the tension on said tendons, thus prestressing the entire unit.

2. The method of forming an elongated structural building unit consisting of a first member having longitudinal ribs, and a second member substantially co-extensive therewith, said method comprising casting the ribbed member of concrete, setting up on a bed a mold for the second member, stretching steel tendons through such mold and applying tension thereto, placing in the mold re-inforcing rods to the ends of which upstanding anchoring devices are secured, filling the mold with concrete in such manner that said anchoring devices project up from the upper surface thereof, bringing the edges of the ribs of said first member into close contact with a surface of said second member while the latter is in plastic condition, thereafter applying masses of concrete to the ends of said members in such manner as to envelop said anchoring devices and bear against said first member, and then, after these masses have hardened, releasing the tension on said tendons.

References Cited

UNITED STATES PATENTS

| | | | |
|---|---|---|---|
| 1,397,650 | 11/1921 | Pedersen | 52—383 |
| 2,159,991 | 5/1939 | Hilpert | 52—602 |
| 2,688,175 | 9/1954 | Billner | 264—87 |
| 2,701,904 | 2/1955 | Roensch | 264—87 |

FOREIGN PATENTS 559,136  6/1958  Canada.

ROBERT F. WHITE, Primary Examiner

K. J. HOVET, Assistant Examiner

U.S. Cl. X.R.

25—118; 52—223, 602